United States Patent
Kitazoe

(10) Patent No.: US 9,137,844 B2
(45) Date of Patent: Sep. 15, 2015

(54) METHOD AND APPARATUS FOR HANDLING USER EQUIPMENT CAPABILITY INFORMATION

(75) Inventor: Masato Kitazoe, Hachiouji (JP)

(73) Assignee: QUALCOMM Incorporated, San Diego, CA (US)

( * ) Notice: Subject to any disclaimer, the term of this patent is extended or adjusted under 35 U.S.C. 154(b) by 1178 days.

(21) Appl. No.: 11/867,649

(22) Filed: Oct. 4, 2007

(65) Prior Publication Data

US 2009/0093280 A1 Apr. 9, 2009

(51) Int. Cl.
*H04M 1/00* (2006.01)
*H04W 76/04* (2009.01)
*H04W 8/24* (2009.01)

(52) U.S. Cl.
CPC ............. *H04W 76/046* (2013.01); *H04W 8/24* (2013.01)

(58) Field of Classification Search
CPC .................................................... H04W 52/02
USPC ........................................................ 455/574
See application file for complete search history.

(56) References Cited

U.S. PATENT DOCUMENTS

| | | | | |
|---|---|---|---|---|
| 6,006,091 | A * | 12/1999 | Lupien | 455/435.1 |
| 7,239,607 | B1 * | 7/2007 | Vijeh et al. | 370/230 |
| 2003/0035401 | A1 | 2/2003 | Shaheen et al. | |
| 2003/0073440 | A1 | 4/2003 | Mukherjee et al. | |
| 2004/0198369 | A1 * | 10/2004 | Kwak et al. | 455/452.2 |
| 2004/0203759 | A1 | 10/2004 | Shaw et al. | |
| 2005/0255893 | A1 * | 11/2005 | Jin et al. | 455/572 |
| 2007/0224988 | A1 * | 9/2007 | Shaheen | 455/436 |
| 2007/0225012 | A1 * | 9/2007 | Chang et al. | 455/452.2 |
| 2008/0010677 | A1 * | 1/2008 | Kashima et al. | 726/12 |
| 2009/0059849 | A1 | 3/2009 | Namba et al. | |
| 2010/0093346 | A1 * | 4/2010 | Song et al. | 455/435.1 |

FOREIGN PATENT DOCUMENTS

| | | | | |
|---|---|---|---|---|
| DE | 202004016720 | | 1/2005 | |
| EP | 1351424 | A2 | 10/2003 | |
| EP | 1513356 | A2 | 3/2005 | |
| EP | 1758300 | * | 2/2007 | .............. H04L 12/24 |
| GB | 2436417 | * | 9/2007 | .............. H04Q 7/38 |
| JP | 09502075 | | 2/1997 | |
| JP | 2007105685 | A | 4/2007 | |

(Continued)

OTHER PUBLICATIONS

Handling of UE capability information in SAE/LTE, 3GPP TSG-RAN WG2, Mar. 26, 2007.*

(Continued)

*Primary Examiner* — Muthuswamy Manoharan
(74) *Attorney, Agent, or Firm* — Michael J. DeHaemer Jr.; Jeffrey Jacobs

(57) ABSTRACT

A method and apparatus for a wireless communication system, sends an initial connection request with the device capabilities of an indicated mobile station. The device capabilities comprise both semi-static capabilities and dynamic capabilities. The semi-static capabilities are stored in the core network. Data is transmitted via a wireless node before the mobile station transitions to an idle state. When transitioning back to an active state from the idle state when the semi-static capabilities have not changed, a connection request is sent with the dynamic capabilities of the user equipment without also transmitting the semi-static mobile station capabilities to the wireless node.

34 Claims, 15 Drawing Sheets

(56) References Cited

FOREIGN PATENT DOCUMENTS

| RU | 2004132828 | 4/2005 |
| WO | WO9535002 | 12/1995 |
| WO | WO9826625 A2 | 6/1998 |
| WO | WO2007105685 A1 | 9/2007 |

OTHER PUBLICATIONS

International Search Report—PCT/US07/080606, International Search Authority—European Patent Office—May 16, 2008.
3GPP2 C.S0001-D, "Introduction to cdma2000 Standards for Spread Spectrum Systems", v2.0, Sep. 6, 2005, Release D.
3GPP2 C.S0002-D, "Physical Layer Standard for cdma2000 Spread Spectrum Systems", v2.0, Sep. 2005, Release D.
3GPP2 C.S0003-D, "Medium Access Control (MAC) Standard for cdma2000 Spread Spectrum Systems", v2.0, Sep. 2005, Release D.
3GPP2 C.S0004-D, "Signaling Link Access Control (LAC) Standard for cdma2000 Spread Spectrum Systems", v2.0, September 20005, Revision D.
3GPP2 C.S0006-D, "Analog Signaling Standard for cdma2000 Spread Spectrum Systems", v2.0, Sep. 2005, Release D.
IEEE 802.11, "Wireless LAN Medium Access Control (MAC) and Physical Layer (PHY) specification", Amendement 4, Jul. 2006.
IEEE 802.16, "Air Interface for Fixed and Mobile Broadband Wireless Access Systems—Amendment 2: Physical and Medium Access Control Alyers for Combined Fixed and Mobile Operation in Licensed Brands", Corrigendum 1, 2005.
IEEE 802.20, "Air Interface Specification", Jan. 2006.
Written Opinion—PCT/US07/080606, International Search Authority—European Patent Office—May 16, 2008.
3GPP2 C.S0005-D, "Upper Layer (Layer 3) Signaling Standard for cdma2000 Spread Spectrum Systems", v2.0, Sep. 2005, Release D.
3GPP2 C.S0024, Version 2.0: "cdma2000 High Rate Packet Data Air Interface Specification," pp. 1-441 (Oct. 27, 2000).
European Office Action—EP07853804, International Search Authority—European Patent Office—Jan. 29, 2010.
TIA/EIA-95-B, "Mobile Station-Base Station Compatibility Standard for Wideband Spread Spectrum Cellular Systems", Feb. 1999.
3GPP TSG-RAN WG 2 meeting #56-bis R2-070066, Qualcomm Europe, Framework for UE capability handling in LTE, Jan. 15, 2007.
Taiwan Search Report—TW096137878—TIPO—Mar. 21, 2012.

* cited by examiner

METHOD AND APPARATUS FOR HANDLING USER EQUIPMENT CAPABILITY INFORMATION

BACKGROUND

I. Field

The following description relates generally to wireless communications, and more particularly to handling user equipment capability information.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power). Examples of such multiple-access systems may include code division multiple access (CDMA) systems, time division multiple access (TDMA) systems, frequency division multiple access (FDMA) systems, 3GPP LTE systems, orthogonal frequency division multiplexing (OFDM), localized frequency division multiplexing (LFDM), orthogonal frequency division multiple access (OFDMA) systems, and the like.

In a wireless communication system, a Node B (or base station) may transmit data to a user equipment (UE) on the downlink and/or receive data from the UE on the uplink. The downlink (or forward link) refers to the communication link from the Node B to the UE, and the uplink (or reverse link) refers to the communication link from the UE to the Node B. The Node B may also send control information (e.g., assignments of system resources) to the UE and/or a core network. Similarly, the UE may send control information to the Node B to support data transmission on the downlink and/or for other purposes.

One type of control information exchanged between the UE and Node B is the non-static capabilities of the UE. Conventionally, the device capabilities are exchanged whenever the UE enters the active state. Since the UE can enter an idle state multiple times when connected to the wireless communication system, the non-static capabilities of the UE can be transmitted multiple times during the connection. This transmission of device capabilities adds to the signaling load at the state transition and thus slows the time needed to make the transition.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance an aspect, a method for a wireless communication system, sends an initial connection request, the request comprising device capabilities of an indicated user equipment. The device capabilities comprising semi-static capabilities and dynamic capabilities. The semi-static capabilities are to be stored in the core network. Data is transmitted via a wireless node and then the mobile station transitions to an idle state. When transitioning back to an active state from the idle state when the semi-static capabilities have not changed, a connection request is sent with the dynamic capabilities of the user equipment without also transmitting the semi-static device capabilities to the wireless node.

In accordance with an aspect, a method for a wireless communication system, an indication is received of semi-static capabilities of an indicated user equipment upon initial connection to the wireless communication system. The semi-static capabilities of the indicated user equipment are stored at least until the indicated user equipment de-registers from the wireless communication system. Then, when the indicated user equipment returns to an active state, the semi-static capabilities of the indicated user equipment are indicated to a Node B associated with the indicated user equipment.

In accordance with another aspect, a method for a wireless communication system, a connection request is received to establish an active connection. The connection request indicates at least some device capabilities of an indicated mobile station. The mobile station capabilities sent with the connection request is determined. When semi-static capabilities of the indicated mobile station are not sent with the connection request, the semi-static capabilities of the indicated mobile station are requested from a core network. An indication of the semi-static capabilities of the indicated mobile station is then received from the core network.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
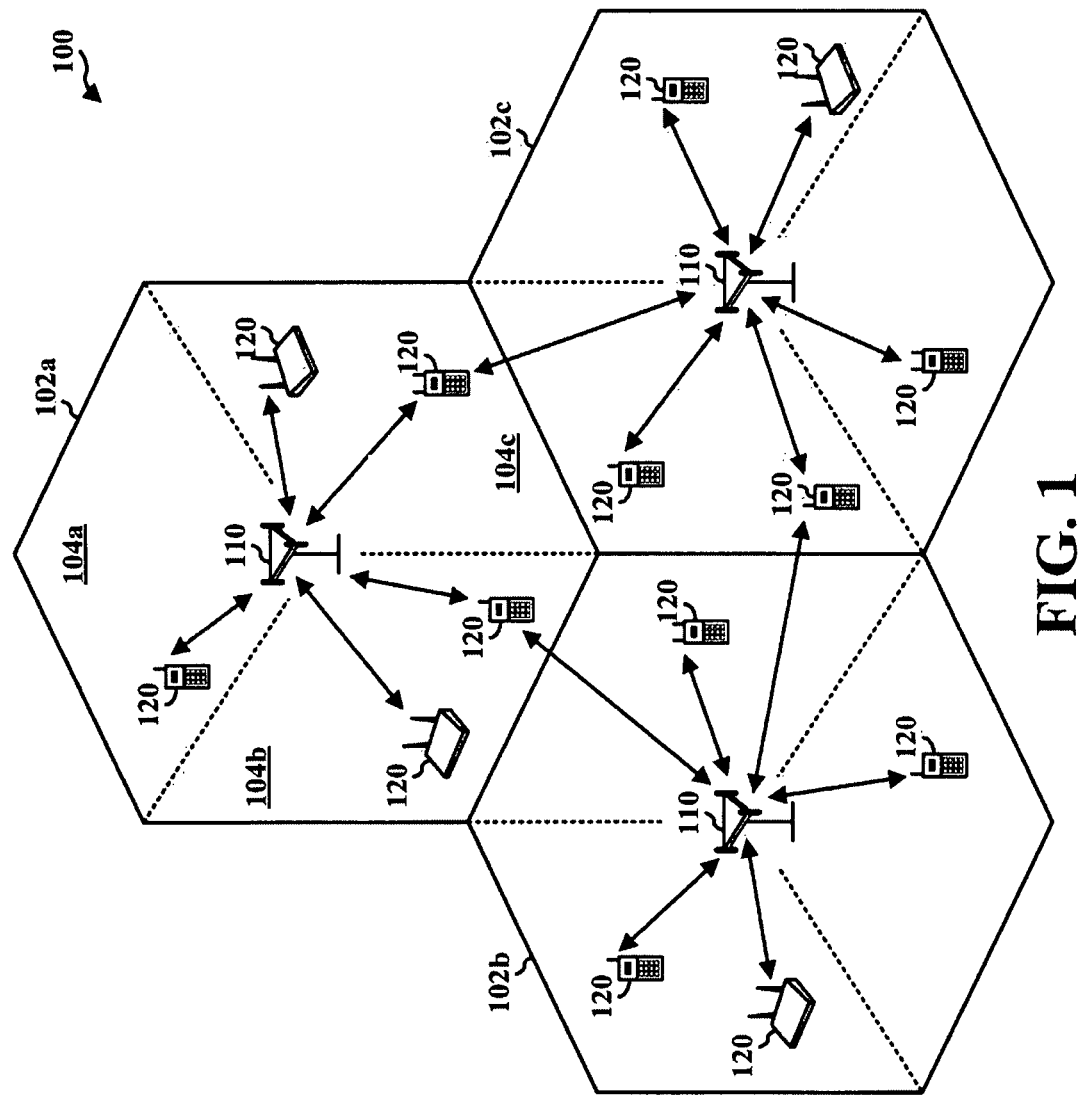
FIG. 1 illustrates a wireless communication system in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

In addition, various aspects of the disclosure are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are descried in the context of an ad-hoc or unplanned/semi-planned deployed wireless communication environment. One skilled in the art should appreciate that similar techniques could apply to other communication environments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with user equipment. User equipment can also be called a subscriber system, a subscriber unit, mobile station, mobile, remote station, remote terminal, access terminal, user terminal, user agent, a user device, or user equipment. User equipment may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for uplink transmission in LTE, and 3GPP terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

LTE utilizes orthogonal frequency division multiplexing (OFDM) on the downlink and single-carrier frequency division multiplexing (SC-FDM) on the uplink. OFDM and SC-FDM partition the system bandwidth into multiple (N) orthogonal subcarriers, which are also commonly referred to as tones, bins, etc. Each subcarrier may be modulated with data. In general, modulation symbols are sent in the frequency domain with OFDM and in the time domain with SC-FDM. For LTE, the spacing between adjacent subcarriers may be fixed, and the total number of subcarriers (N) may be dependent on the system bandwidth. In one design, N=512 for a system bandwidth of 5 MHz, N=1024 for a system bandwidth of 10 MHz, and N=2048 for a system bandwidth of 20 MHz. In general, N may be any integer value.

FIG. 1 illustrates a wireless communication system 100 with multiple base stations 110 and multiple terminals 120, such as may be utilized in conjunction with one or more aspects. A base station is generally a fixed station that communicates with the terminals and may also be called an access point, a Node B, or some other terminology. Each base station 110 provides communication coverage for a particular geographic area, illustrated as three geographic areas, labeled 102a, 102b, and 102c. The term "cell" can refer to a base station and/or its coverage area depending on the context in which the term is used. To improve system capacity, a base station coverage area may be partitioned into multiple smaller areas (e.g., three smaller areas, according to cell 102a in FIG. 1), 104a, 104b, and 104c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 120 are typically dispersed throughout the system, and each terminal may be fixed or mobile. A terminal may also be called user equipment, a mobile station, user equipment, a user device, or some other terminology. A terminal may be a wireless device, a cellular phone, a personal digital assistant (PDA), a wireless modem card, and so on. Each terminal 120 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

Terminals transition through various states while being connected to the wireless communication system. The states can include: a detached state, where the terminal is detached from the wireless communication system; an idle state, where the terminal is connected but not actively communicating data; and an active state, where data is being transmitted to/from the terminal. The states can be transitioned as result of inactivity (e.g., from the active state to the idle state), a need to transmit/receive data (e.g., idle to active state), or based on an event (e.g., a user pressing the on/off button or entering airplane mode). In addition to states, each terminal has various capabilities including static, semi-static, and dynamic capabilities. Static capabilities do not change. Semi-static capabilities can change when an accessory (e.g., GPS accessory) is coupled/decoupled from the terminal, as well when a firmware upgrade is performed on the terminal. Dynamic capabilities change frequently, possibly every active connection.

Figure 2:
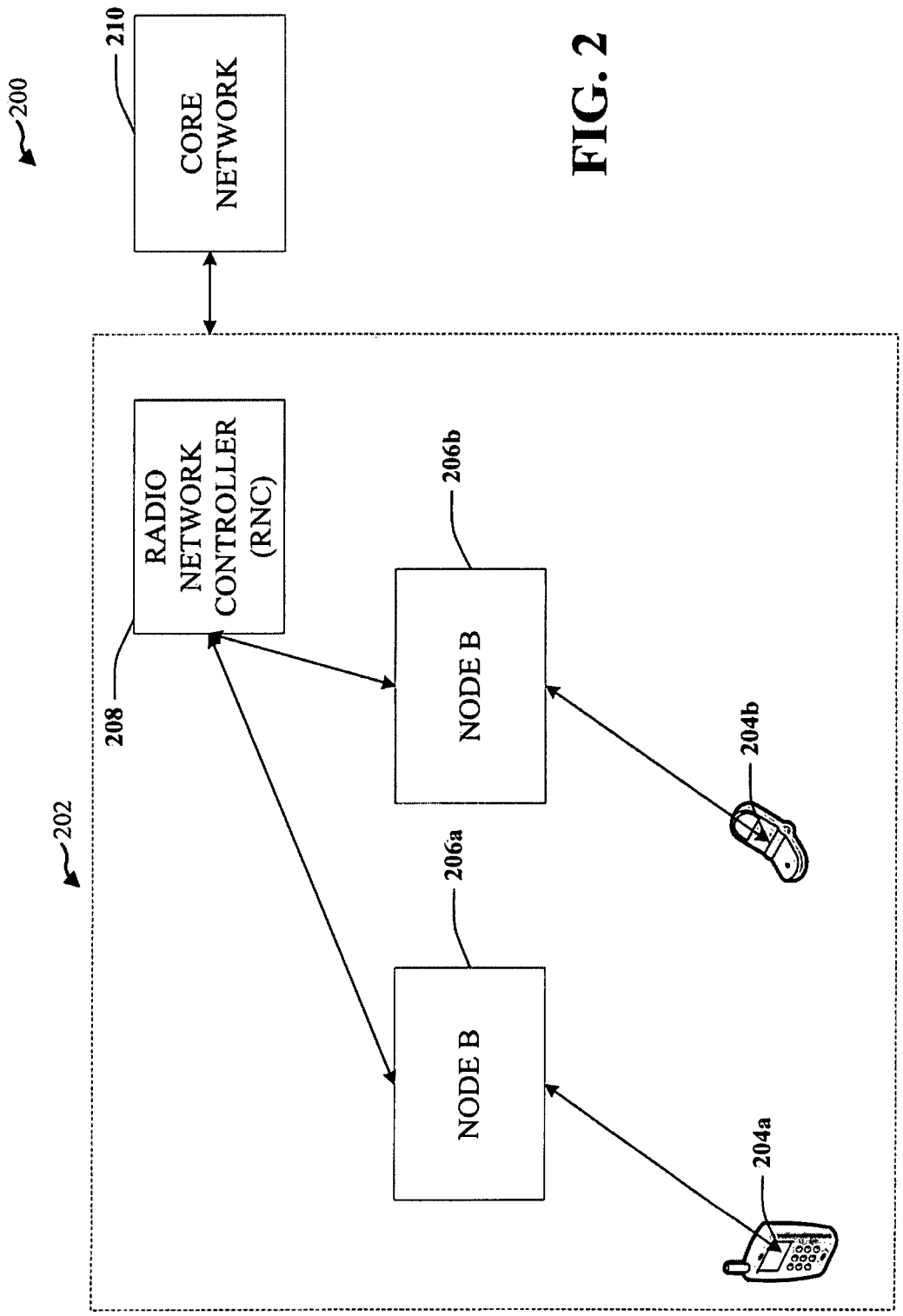
FIG. 2 is a block diagram of an example communications system.

FIG. 2 is an illustration of a wireless communication system 200 in accordance with various aspects. The wireless communication system has a core network 210 and a radio network 202. The radio network has one or more radio network controllers (RNC), which are coupled to one or more Node Bs (206a, 206b). The Node B can be an evolved Node B (eNB), which incorporates some or all of the RNC functions. User equipment (UE) terminals (204a, 204b) are communicatively coupled to the Node B. The radio network controller controls various flow within the radio network and is coupled to the core network. The core network can be a backend network of a telecommunication company and can comprise one or more servers for billing, authentication, and access-control purposes. The core network can be connected by a wired or wireless-based network to the radio networks. One will appreciate that a core network 210 can be coupled with multiple radio networks.

Conventionally, capabilities are released when the UE transitions to a non-active state from an active state. Then, upon returning to the active state, the capabilities are once again provided to the wireless network. However, this is inefficient as there is signaling overhead in re-supplying semi-static capabilities that likely did not change since connecting to the wireless network. In addition, while the signaling is being performed, the time needed to transition to the active state from the idle state increases. Thus, in accordance with an aspect, semi-static capabilities are stored in the core network for a UE and not released until detachment from the wireless network. Dynamic capabilities, however, are released when entering a non-active state from an active state.

Figure 3:
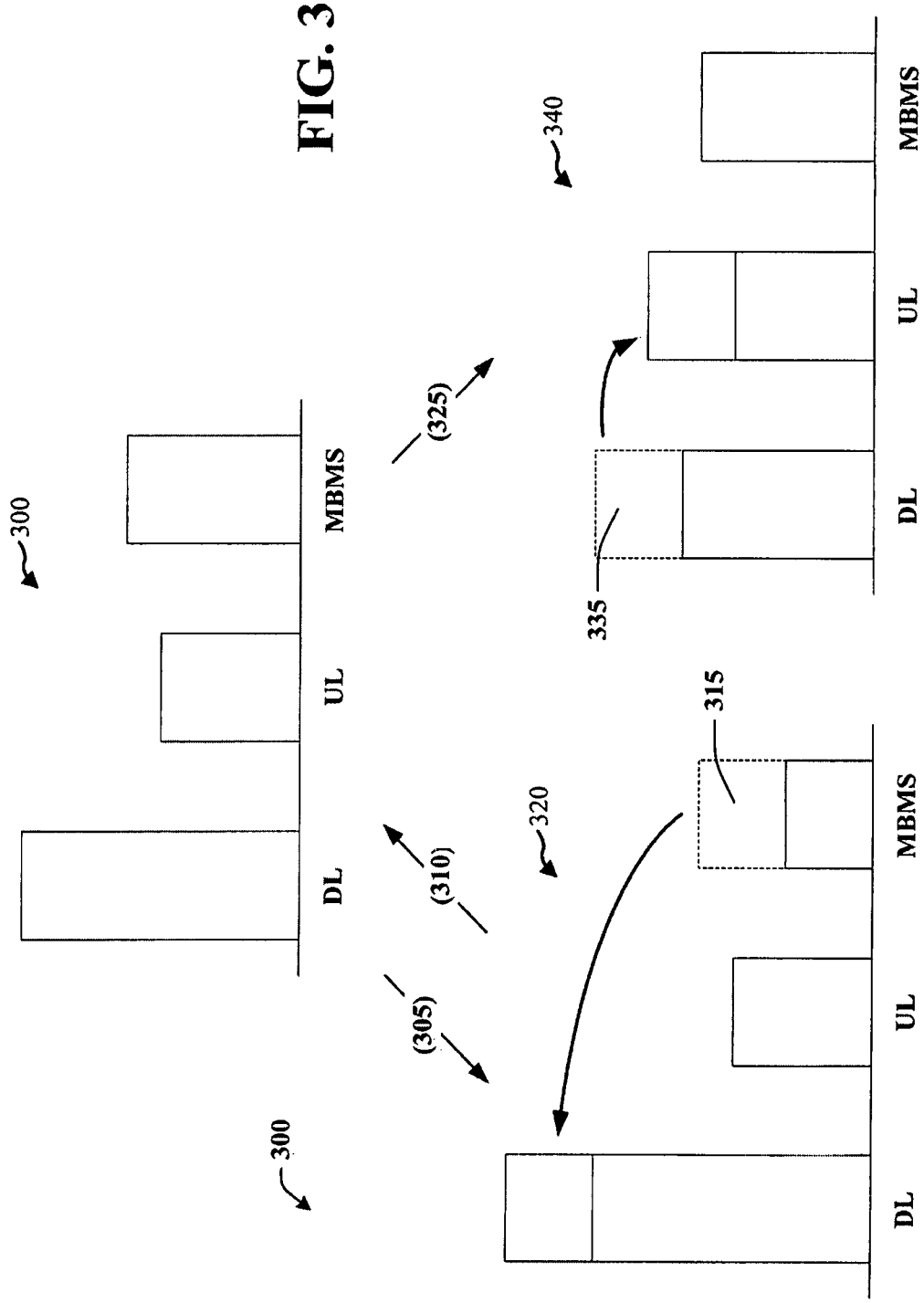
FIG. 3 shows an example of dynamic capabilities of user equipment.

FIG. 3 illustrates one type of dynamic capability in which dynamic UE capability is achieved by the UE "borrowing" one capability for the use of another capability according to one aspect. According to one aspect, UE capabilities similar to those of UMTS in LTE are used. In particular, FIG. 3 illustrates 3 types of capabilities: downlink capability on DL-SCH (UE category in downlink as in HSDPA); uplink capability on UL-SCH (UE category in uplink as in HSUPA); and Multimedia Broadcast Multicast Service (MBMS) reception capability.

The MBMS reception capability is not known to the network, although minimum capability is pre-defined separately. This set of capabilities is determined by the design of the UE and can guarantee the services that the UE is designed to support. It should be noted that "borrowing" can be done to boost capability that can be used for Non-Guaranteed Bit Rate (GBR) service.

Initially, the capabilities of the illustrated UE are shown in 300. At 305, when a download is initiated, the UE is not receiving any MBMS service so it borrows a portion 315 of MBMS capability, not to exceed a level needed to guarantee the minimum MBMS capability for the UE. The borrowed capability is allocated to downlink capability. This information can be communicated to E-UTRAN at initial setup of radio resource control (RRC) connection. The resulting capabilities are shown in chart 320. At 310, the UE detects that the whole MBMS capability is needed for MBMS reception. The capability change is reported to the E-UTRAN and the capabilities return to the chart shown in 300. At 325, a higher uplink data rate is needed so the UE borrows a portion 335 of downlink capability not to exceed the amount necessary to maintain the guaranteed downlink bit rate. The resulting capability chart is shown in 340.

Figure 4:
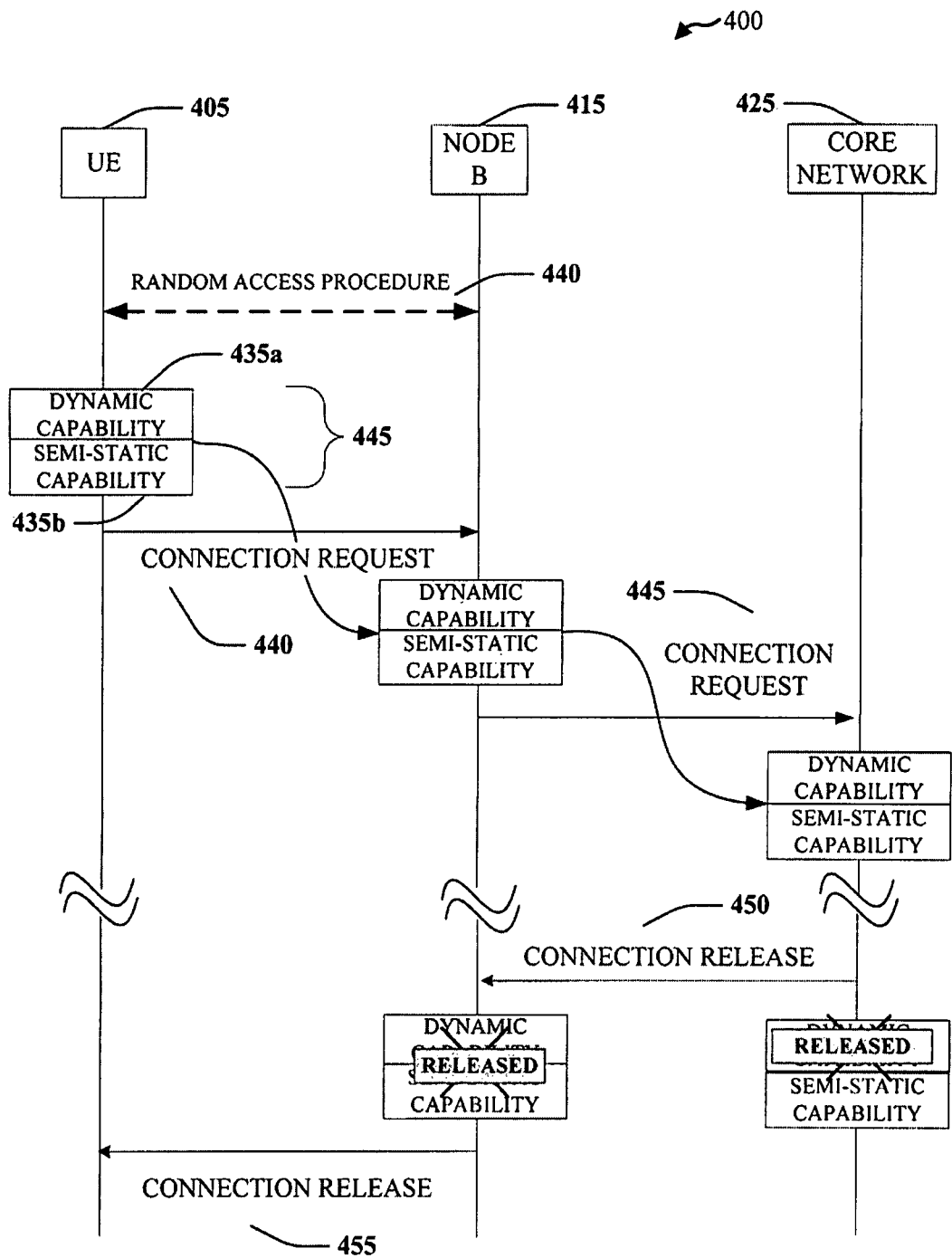
FIG. 4 depicts signal flow and capabilities stored during initial connection to the wireless network and connection release when the UE goes into an idle state in accordance with aspects set forth herein.

FIG. 4 illustrates an example of initial access to the wireless network according to aspects described herein. In particular, the signaling flow 400 is depicted. Initially, the wireless network (Node B/Radio network 415 and core network 425) does not have any information for the non-static capabilities of the UE 405 in this scenario. Both dynamic 435a and semi-static part 435b of capability (collectively 435) is signaled in a Connection Request message 440 and both are stored in the serving Node B 415. The Node B 415 passes both capabilities to the core network 425 in connection request 445. One will appreciate that according to one aspect dynamic capabilities may not be forwarded onto the core network. One will also appreciate that the Node B 415 can be an eNB, which incorporates radio network controller functions. According to another aspect, some or all of the signals illustrated and described as flowing to or from a Node B can alternatively be flowing to or from other components of the radio network, such as a radio network controller (RNC).

At active connection release 450 and 455, only the dynamic part of capabilities is released in the core network 425. Any UE context in the Node B 415 including both the semi-static and dynamic capabilities can be released in the serving Node B 415.

Figure 5:
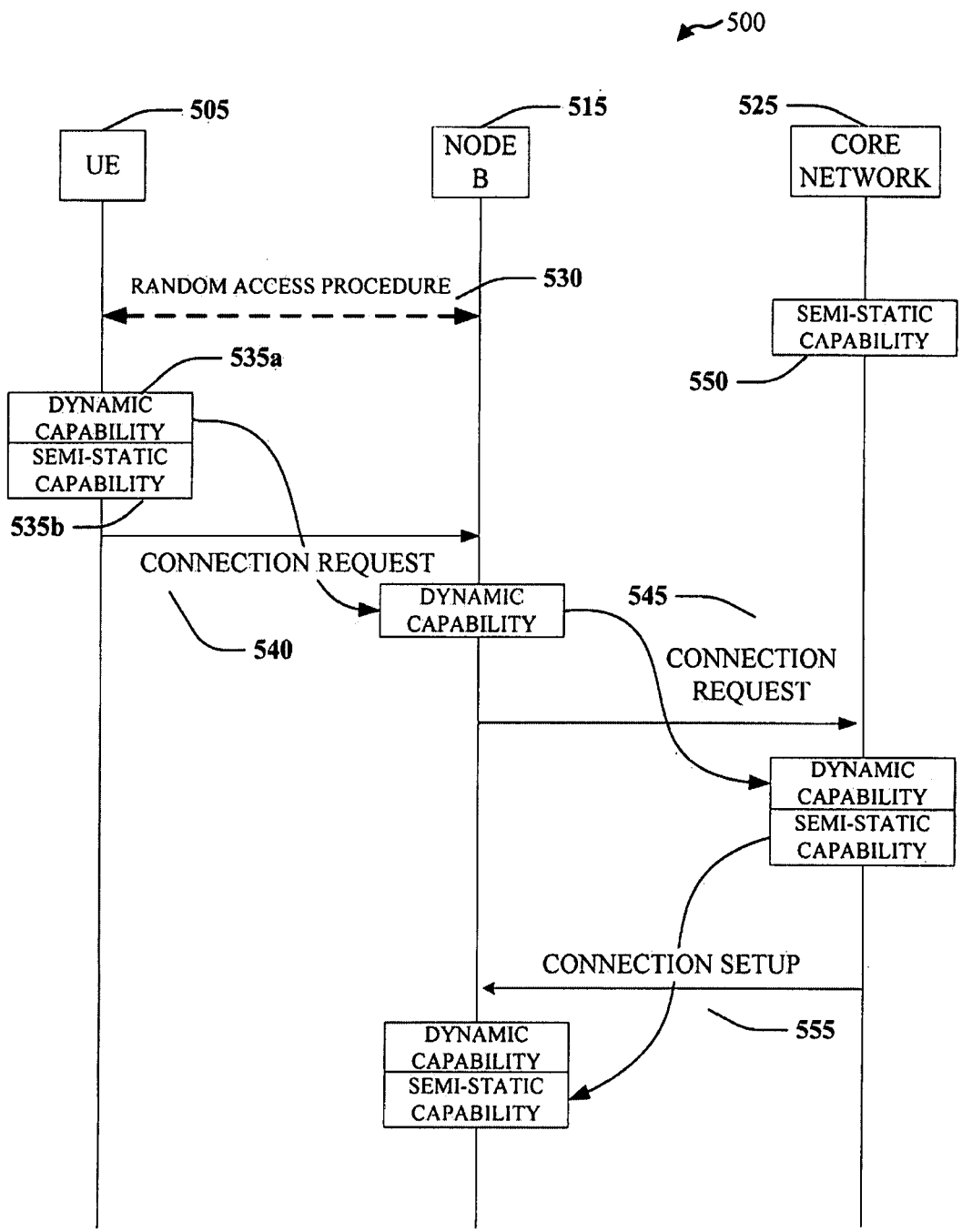
FIG. 5 depicts signal flow and capabilities stored when returning to an active state from an idle state in accordance with aspects set forth herein.
Figure 7:
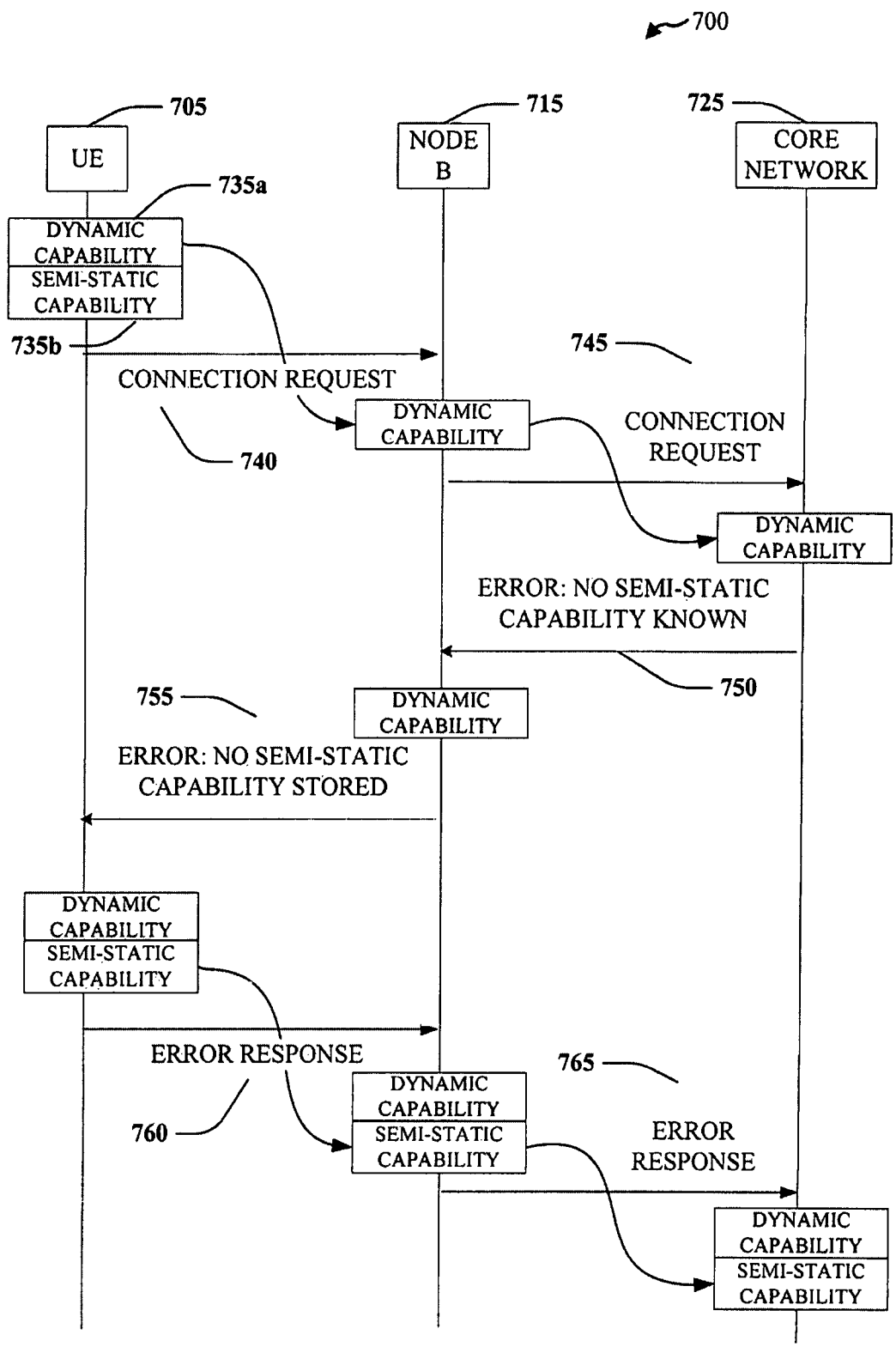
FIG. 7 depicts signal flow error processing when semi-static capabilities are not stored in the core network when the UE returns to an active state from an idle state in accordance with aspects set forth herein.

FIG. 5 illustrates signaling flow for subsequent accesses. It is assumed that semi-static part of UE capability is already stored in the core network and if not error processing can be performed, such as is illustrated in FIG. 7. It is also assumed that the current semi-static capabilities 535b on the UE are the same as the semi-static capabilities 550 stored on the core network. In particular, FIG. 5 illustrates the signal flow during a transition from the idle state to an active state. The UE 505 only includes dynamic capabilities 535a in a Connection Request message 540, achieving reduced information elements in the message and reduced time to transition to the active state. The Node B 515 sends the dynamic capability to the core network as part of Connection Request message 545 and now the core network 525 has both dynamic 535a and semi-static capabilities 550. The semi-static capabilities 550 are passed back to Node B 515 by Connection Setup message 555.

One will appreciate that errors or loss of new semi-static capabilities are possible when the semi-static capabilities change when the UE is in the idle state. Thus, semi-static capabilities 550 on the core network do not match the current semi-static capabilities of the UE 535b. Since these capabilities are semi-static, such problems should be rare. In accordance with one aspect to prevent these problems, the UE can determine if the semi-static capabilities have changed since initial network connection and if so, update the network with the current semi-static capabilities when returning from an idle state. For example, the UE can store the semi-static capabilities transmitted to the network and compare them to the current semi-static capabilities upon a state transition from idle to an active state. Since this is a rare occurrence, the transition from idle to active state will still be faster the majority of the time.

Figure 6:
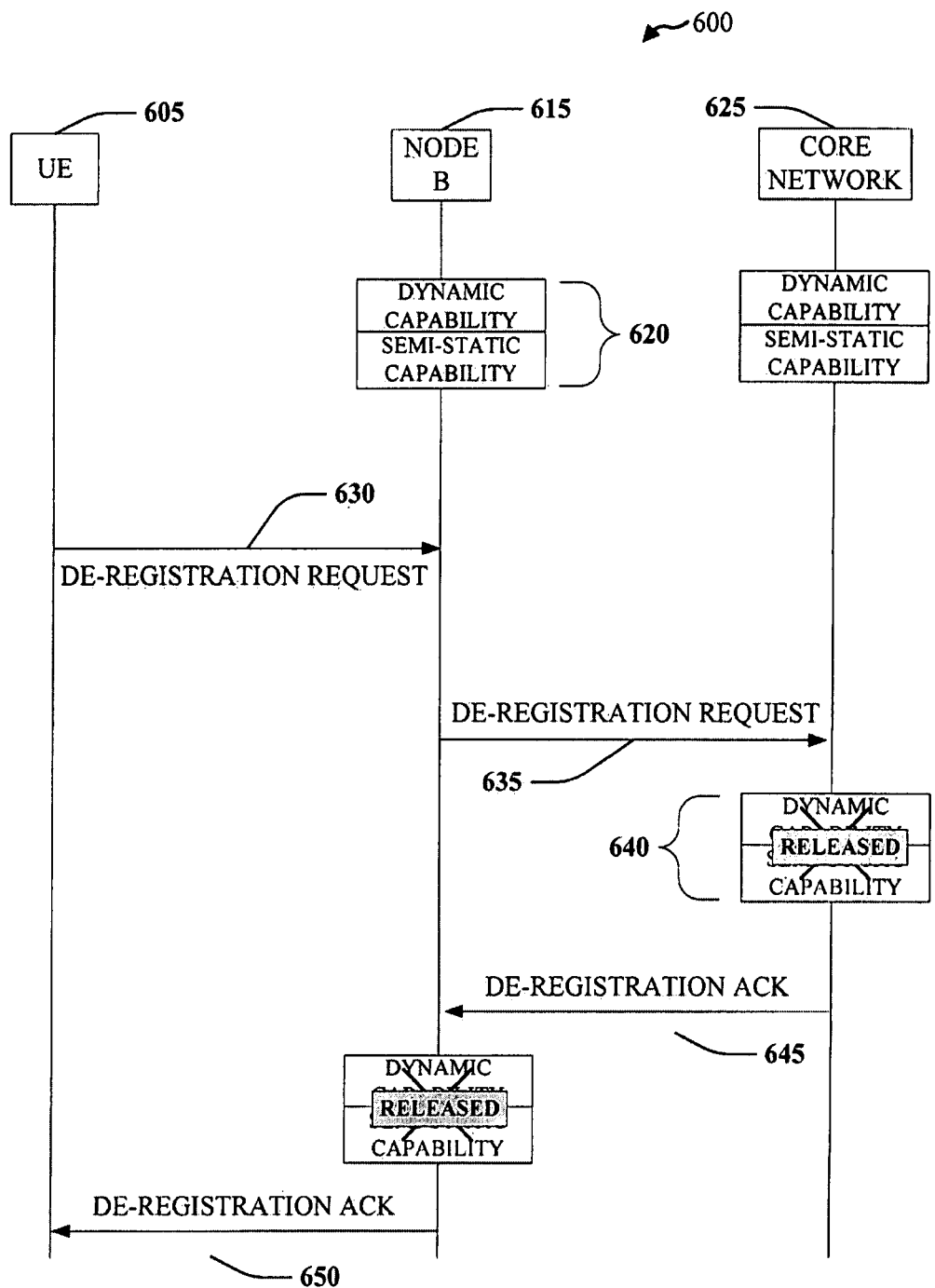
FIG. 6 depicts signal flow and capabilities released when the UE de-registers from the wireless network in accordance with aspects set forth herein.

FIG. 6 illustrates signaling flow upon UE de-registration from the wireless network. In particular, signal flow 600 is shown upon UE de-registration from the network. It is assumed that the UE is in the active state and thus Node B/radio network 615 and the core network 625 has dynamic and semi-static capabilities 620 for the UE. A De-Registration Message 630 is sent from the UE 605. The Node B forwards a De-Registration Request 635 to the core network 625. As a result, the core network can release the capabilities 640 of the UE and send a De-Registration Acknowledgement (ACK) message 645 to Node B. Node B can then release the capabilities of the UE as well and send a De-Registration Acknowledgment message 650 to UE.

FIG. 7 illustrates signaling flow when an error occurs. While errors (e.g., no semi-static capabilities stored in the core network when transitioning from the idle state to the active state) should be a very rare case, such errors can occasionally occur. Thus, FIG. 7 illustrates a signal flow 700 in accordance with one aspect. In particular, FIG. 7 illustrates error flow when the core network does not have semi-static capabilities and no semi-static capabilities were provided by the UE. The UE 705 sends semi-static capability 735b to the Node B 715 in a Connection Request message 740. Since semi-static capabilities were not supplied, Node B passes a connection request message 745 to the core network 725 to retrieve the semi-static capabilities. However, the core network does not have any semi-static capabilities so an error message 750 indicating the situation is sent to Node B and forwarded to the UE in message 755. The semi-static capability is then transmitted to Node B in an error response message 760. The semi-static capability is then forwarded in an error response message 765 to the core network for storage. One will appreciate that instead of an error response message 765 a Connection Request message can be sent.

One will appreciate that other errors can be handled in similar manners in other aspects.

Figure 8:
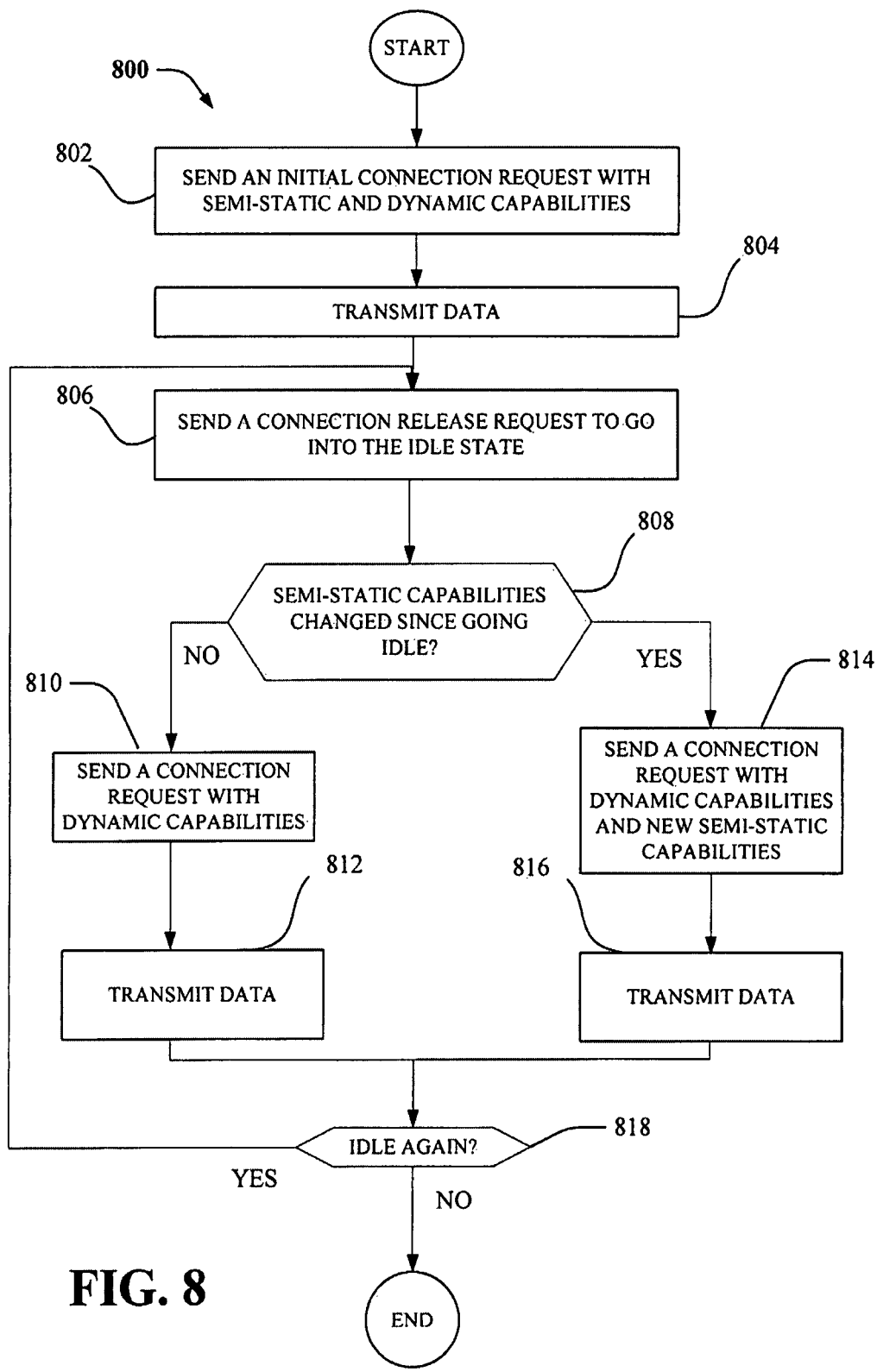
FIG. 8 illustrates a method of the UE in conjunction with a wireless networking environment disclosed herein.
Figure 9:
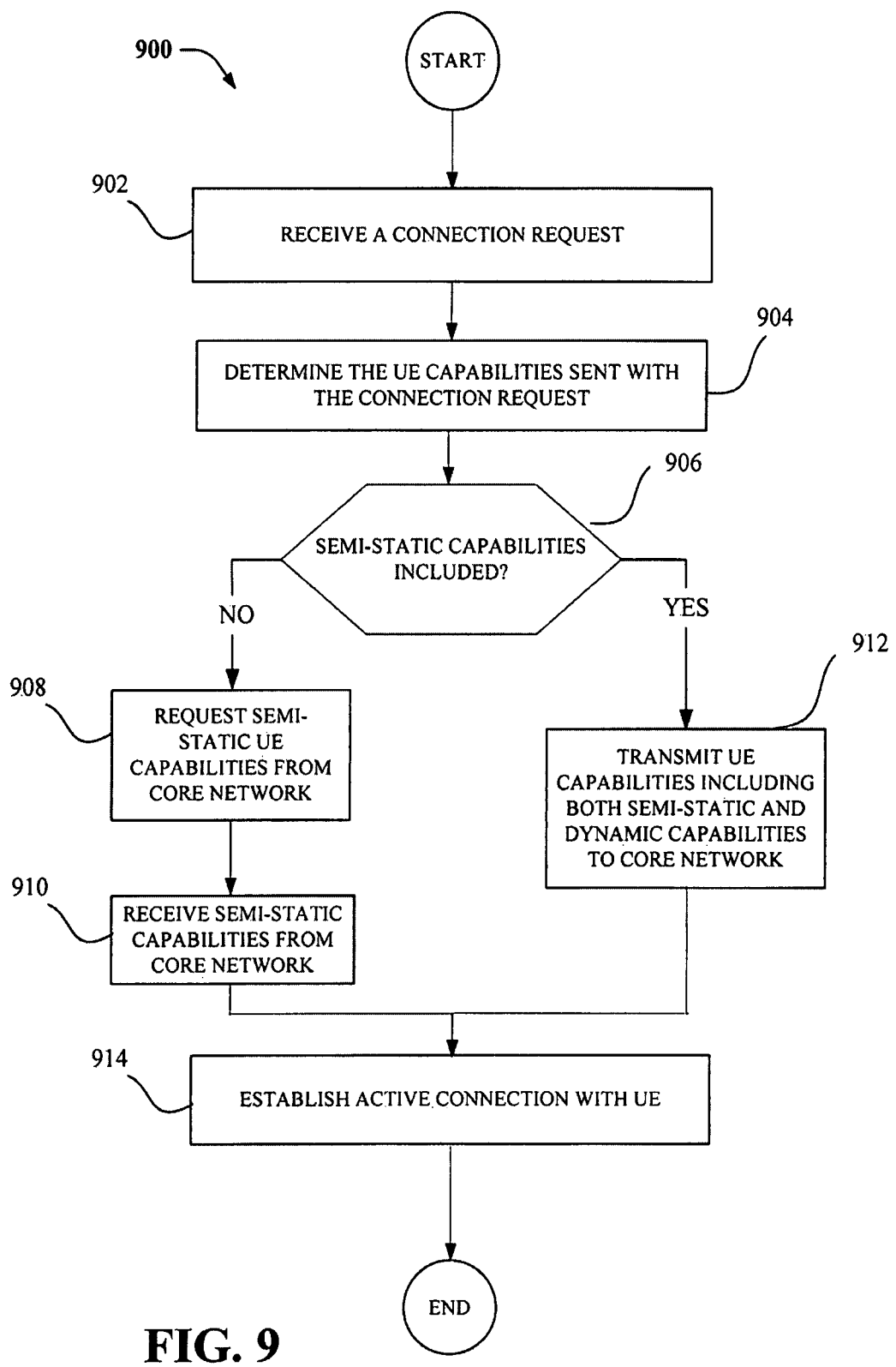
FIG. 9 illustrates a method of a node B/radio network in conjunction with a wireless networking environment disclosed herein.
Figure 10:
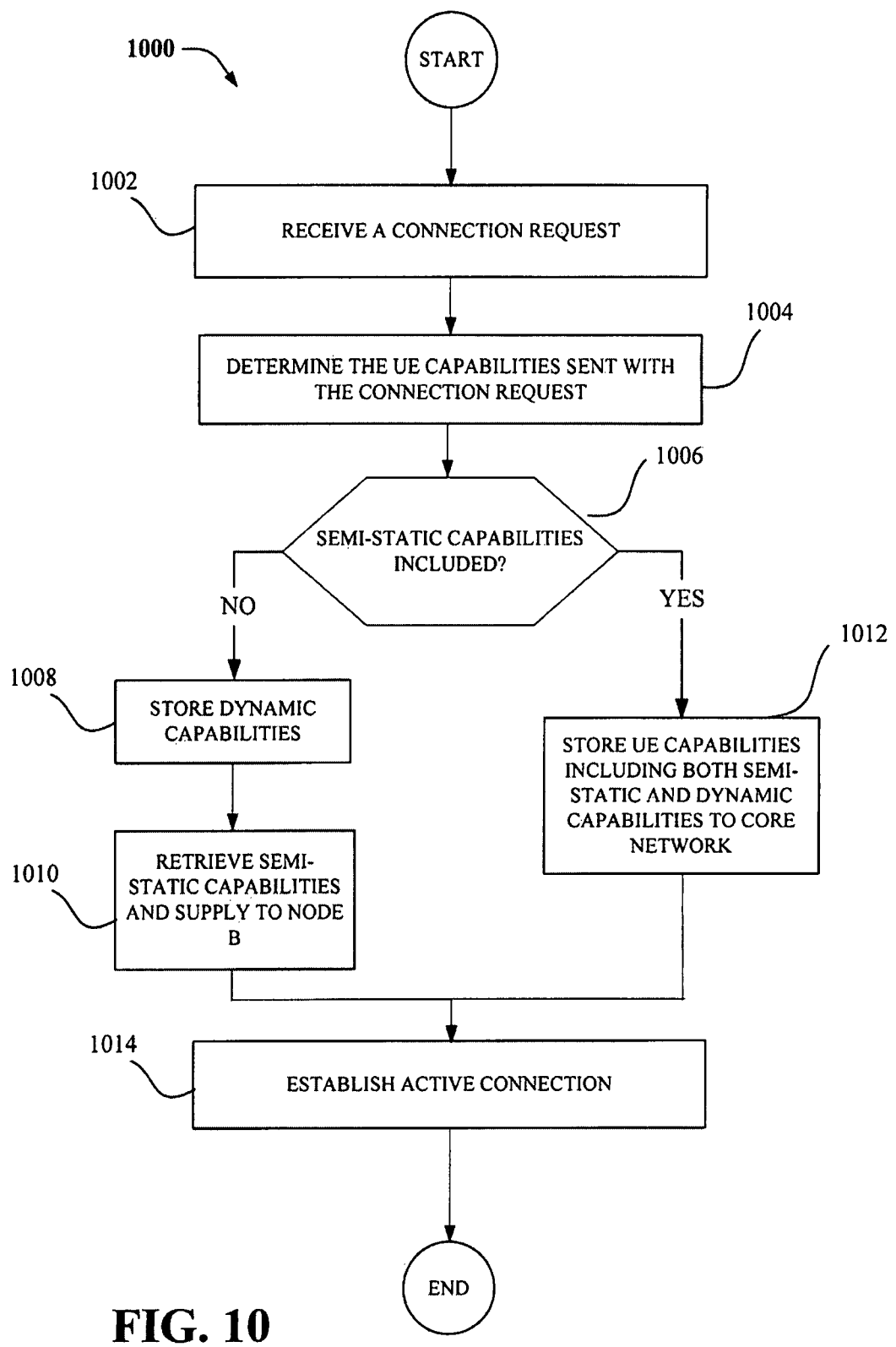
FIG. 10 illustrates a method of a core network in conjunction with a wireless networking environment disclosed herein.

Referring to FIGS. 8-10, methodologies relating to a fast transition from an idle state to an active state are illustrated in accordance with aspects herein. While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Furthermore, those skilled in the art will appreciate that although the methods are shown for a single UE connected to the network, the methods performed by the node/radio network controller and the core network can be performed for multiple UEs. In addition, one will appreciate that various error flows are not shown for the sake of clarity and brevity.

Turning specifically to FIG. 8, an example methodology 800 that facilitates a fast transition from an idle state to an active state according to an aspect is illustrated. Method 800 can facilitate a fast transition by being performed by a UE in a wireless communication network. The method starts at 802, where the method sends an initial connection request with semi-static and dynamic capabilities. The method, at 804, transmits data while the UE is the active state. At block 806, the method sends a connection release request to go into the idle state. The method at 808, determines if the semi-static capabilities have changed since going idle. If it is determined that the capabilities have not changed, the method executes 810 and 812. Otherwise, the method executes 814 and 816, wherein the method at 814 sends a connection request with dynamic capabilities and at least the changed semi-static capabilities then transmits data packets at 816. At 810, the method sends a connection request with the dynamic capabilities without resending the previously stored semi-static capabilities. At 812, the method transmits data while in the active state. After 812 or 816, the method goes to block 818. At 818, the method determines whether the UE wants to idle again. If so, the method returns to block 806 and if not additional processing (not shown) can be performed. For example, the UE can detach from the wireless communication network.

One will appreciate that in simpler aspects, the UE does not keep track of whether the semi-static capabilities have changed since network connection. In particular, since it is assumed that the semi-static capabilities change very infrequently, the majority of the time, blocks 810 and 812 are executed, not 814 and 816. Thus, in some aspects, the method can proceed from 806 to 810 without significant detrimental effects. Further one will appreciate that although the UE enters an active state and can transmit data in blocks 804, 812, and 816, a data transmission may not actually occur.

Turning to FIG. 9, an example methodology 900 that facilitates transition from an idle state to an active state in wireless communication system according to an aspect is illustrated. Method 900 can facilitate a node (e.g., an enhanced Node base station, eNB, access point (AP), base station or like mechanism) to perform such aspects in a wireless communication network. According to an aspect, at 902, the method receives a connection request. The connection request can be one of an initial connection to the wireless communication network or a connection request to enter an active state again from an idle state. At block 904, the method determines the UE capabilities sent with the request. At 906, the method determines if the semi-static capabilities are included. If it is determined that the semi-static capabilities are included, then the method executes 908 and 910. Otherwise, the method executes 912. At 912, the method requests semi-static capabilities from the core network. Thereafter, at 610, the method receives semi-static capabilities from the core network. One will appreciate that error processing (not shown) can occur if the core network indicates that it does not the semi-static capabilities of the UE, such as requesting that information from the UE. Referring specifically to 612, the method transmits UE capabilities including both semi-static capabilities and dynamic capabilities to the core network. The core network will store the dynamic capabilities until the UE enter a non-active state while the semi-static capabilities are stored until the UE de-registers from the wireless network. After 910 or 912, the method proceeds to 914. At block 914, the method establishes an active connection with the UE.

Turning to FIG. 10, an example methodology 1000 that facilitates fast transitions between an idle state and an active state in wireless communication system according to an aspect is illustrated. Method 1000 can facilitate fast transitions between an idle state and an active state by performing the illustrated methodology in a core network of a wireless communication network. According to an aspect, at 1002, a connection request is received. At block 1004, the method determines the UE capabilities sent with the connection request. At 1006, the method determines if the semi-static capabilities are included with the request. If it is determined that the semi-static capabilities are included, then method executes 1008 and 1010. Otherwise, the method executes 1012. At 1008, the method stores dynamic capabilities until the UE transitions away from an active state. Thereafter, at 1010, the method retrieves the previously stored static capabilities and supplies those capabilities to the Node B facilitating the connection request. Referring specifically to 1012, the method stores both the dynamic capabilities and the semi-static capabilities. The semi-static capabilities are stored until the UE de-registers from the wireless network as oppose to the dynamic capabilities that will be released when the UE enters a non-active state. After 1012 or 1010, the method proceeds to block 1014. At block 1014, the method establishes a connection.

Although not shown, one will appreciate that the methodology can be performed in other manners. For example, instead of determining the UE capabilities included in the connection request, the method can determine the previous state of the UE and perform block 1012 if this is a transition from a previously detached state while performing blocks 1008 and 1010 if the transition is from an idle state. This aspect can be useful for error processing, such as to process an error where a UE incorrectly thinks semi-static capabilities are already stored in the core network. Furthermore, although not shown, one will appreciate that a method is performed to release the dynamic capabilities and semi-static capabilities at the times described herein.

Figure 11:
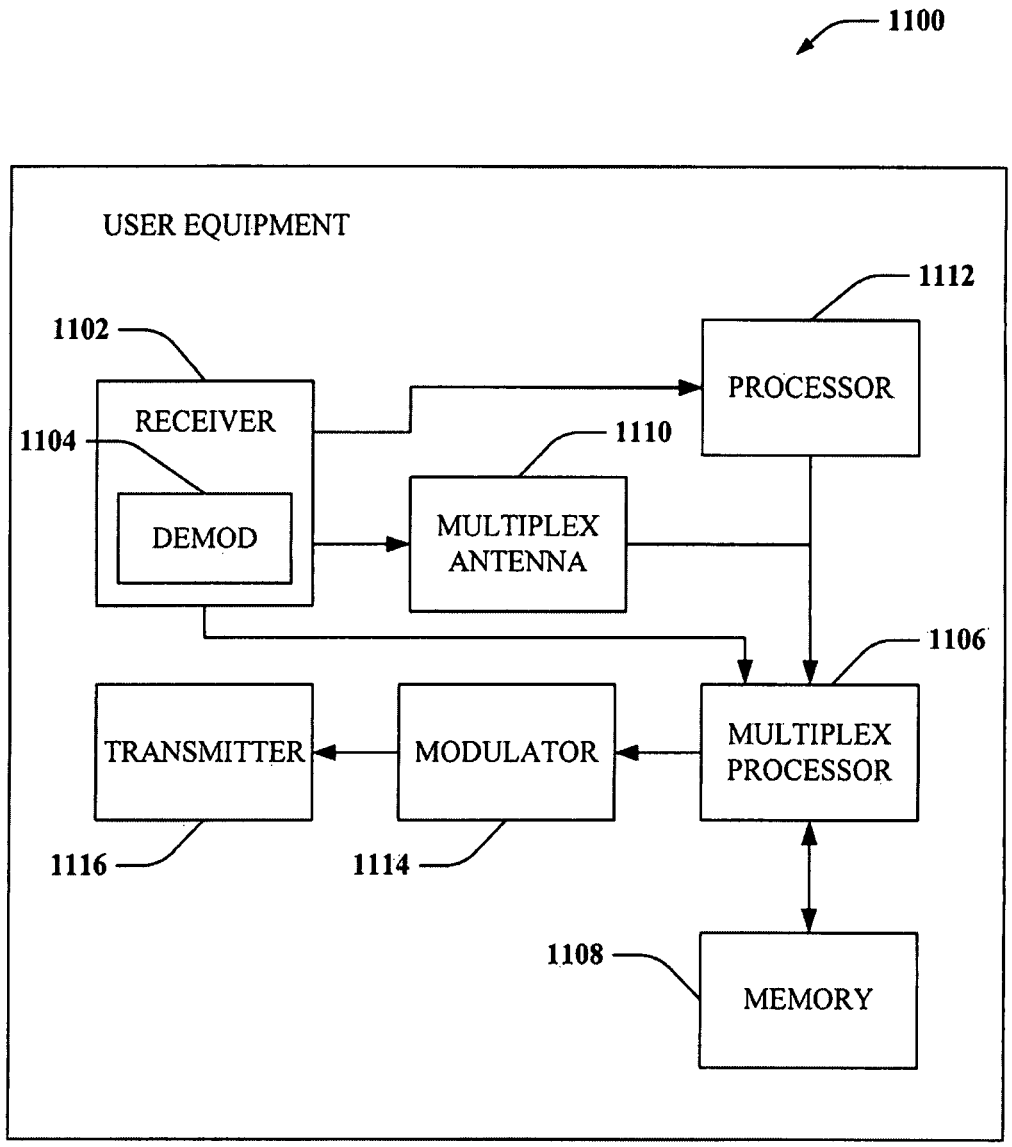
FIG. 11 depicts an exemplary system that facilities fast transition from an idle state in accordance with one or more aspects.

FIG. 11 depicts exemplary user equipment 1100 that can provide feedback to communications networks, in accordance with one or more aspects. Access terminal 1100 comprises a receiver 1102 (e.g., an antenna) that receives a signal and performs typical actions on (e.g., filters, amplifies, downconverts, etc.) the received signal. Specifically, receiver 1102 can also receive a service schedule defining services apportioned to one or more blocks of a transmission allocation period, a schedule correlating a block of downlink resources with a block of uplink resources for providing feedback information as described herein, or the like. Receiver 1102 can comprise a demodulator 1104 that can demodulate received symbols and provide them to a processor 1106 for evaluation. Processor 1106 can be a processor dedicated to analyzing information received by receiver 1102 and/or generating information for transmission by a transmitter 1116. Additionally, processor 1106 can be a processor that controls one or more components of access terminal 1100, and/or a processor that analyzes information received by receiver 1102, generates information for transmission by transmitter 1116, and controls one or more components of access terminal 1100. Additionally, processor 1106 can execute instructions for interpreting a correlation of uplink and downlink resources received by receiver 1102, identifying un-received downlink block, or generating a feedback message, such as a bitmap, appropriate to signal such un-received block or blocks, or for analyzing a hash function to determine an appropriate uplink resource of a plurality of uplink resources, as described herein.

Access terminal 1100 can additionally comprise memory 1108 that is operatively coupled to processor 1106 and that may store data to be transmitted, received, and the like. Memory 1108 can store information related to downlink resource scheduling, protocols for evaluating the foregoing, protocols for identifying un-received portions of a transmission, for determining an indecipherable transmission, for transmitting a feedback message to an access point, and the like.

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Receiver 1102 is further operatively coupled to multiplex antenna 1110 that can receive a scheduled correlation between one or more additional blocks of downlink transmission resources and a block of uplink transmission resources. A multiplex processor 1106 can include a multi-digit bitmap within a feedback message that provides an ACK or NACK message indicating whether a first downlink block and each of one or more additional downlink blocks are received or un-received, over a single uplink resource. Further, a processor 1112 can perform various functions, as described herein, as well as other functions.

Access terminal 1100 still further comprises a modulator 1114 and a transmitter 1116 that transmits the signal to, for instance, a base station, an access point, another access terminal, a remote agent, etc. Although depicted as being separate from the processor 1106, it is to be appreciated that signal generator 1110 and indicator evaluator 1112 may be part of processor 1106 or a number of processors (not shown).

Figure 12:
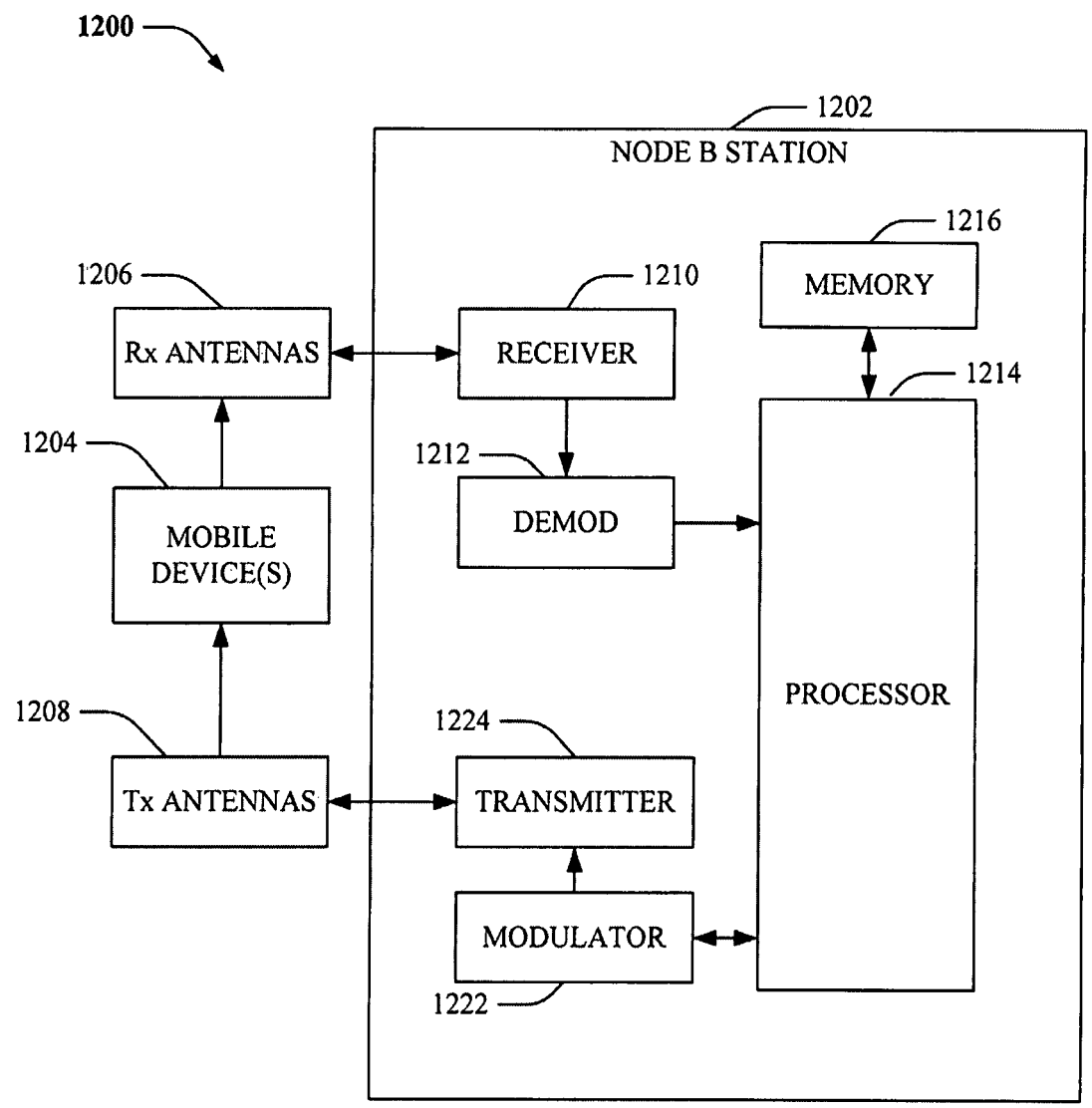
FIG. 12 depicts an exemplary system that facilities fast transition from an idle state in accordance with one or more aspects.

FIG. 12 is an illustration of a system 1200 that facilitates provision of feedback related to lost transmission data for an LTE network. System 1200 comprises a base station 1202 (e.g., access point, . . . ) with a receiver 1210 that receives signal(s) from one or more mobile devices 1204 through a plurality of receive antennas 1206, and a transmitter 1222 that transmits to the one or more mobile devices 1204 through a transmit antenna 1208. Receiver 1210 can receive information from receive antennas 1206 and can further comprise a signal recipient (not shown) that receives feedback data related to an un-received or indecipherable data packet. Additionally, receiver 1210 is operatively associated with a demodulator 1212 that demodulates received information. Demodulated symbols are analyzed by a processor 1214 that is coupled to a memory 1216 that stores information related to correlating uplink and downlink resources, providing dynamic and/or static correlations from a network, as well as data to be transmitted to or received from mobile device(s) 1204 (or a disparate base station (not shown)), and/or any other suitable information related to performing the various actions and functions set forth herein.

The techniques described herein may be implemented by various means. For example, these techniques may be implemented in hardware, software, or a combination thereof. For a hardware implementation, which may be digital, analog, or both digital and analog, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 13:
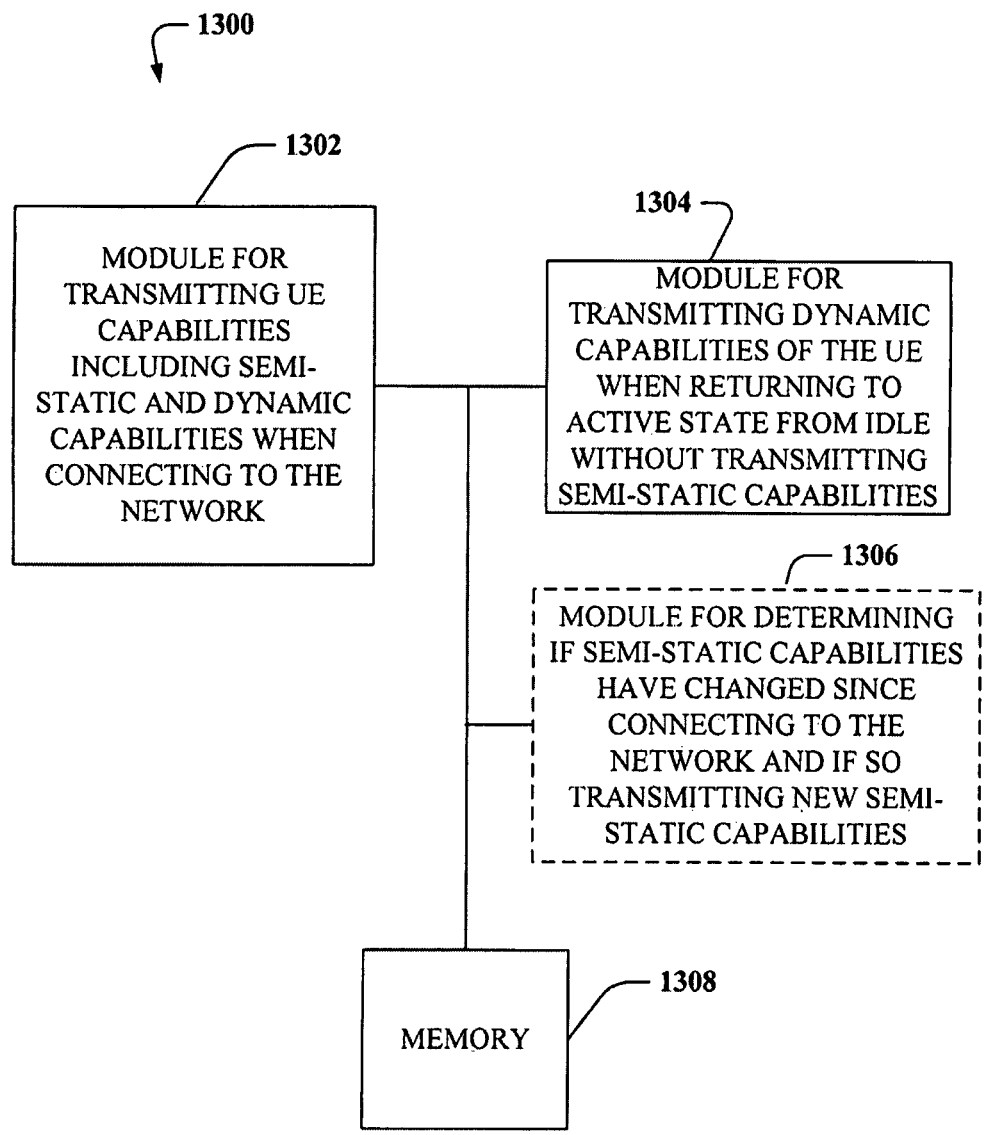
FIG. 13 depicts an exemplary system of user equipment in conjunction with a wireless communication environment in accordance with one or more aspects.

Referring now to FIG. 13, a system 1300 that facilitates fast transitions from an idle state to an active state in a wireless communication is illustrated. System 1300 can include a module 1302 for transmitting UE capabilities including semi-static and dynamic capabilities when connecting to the wireless network, a module 1304 for transmitting dynamic capabilities of the UE when returning to active state from an idle state without transmitting semi-static capabilities and optionally a module 1306 for determining if semi-static capabilities have changed since connecting to the wireless network and if so transmitting new semi-static capabilities. Modules 1302-1306 may be a processor or any electronic device and may be coupled to memory module 1308.

Figure 14:
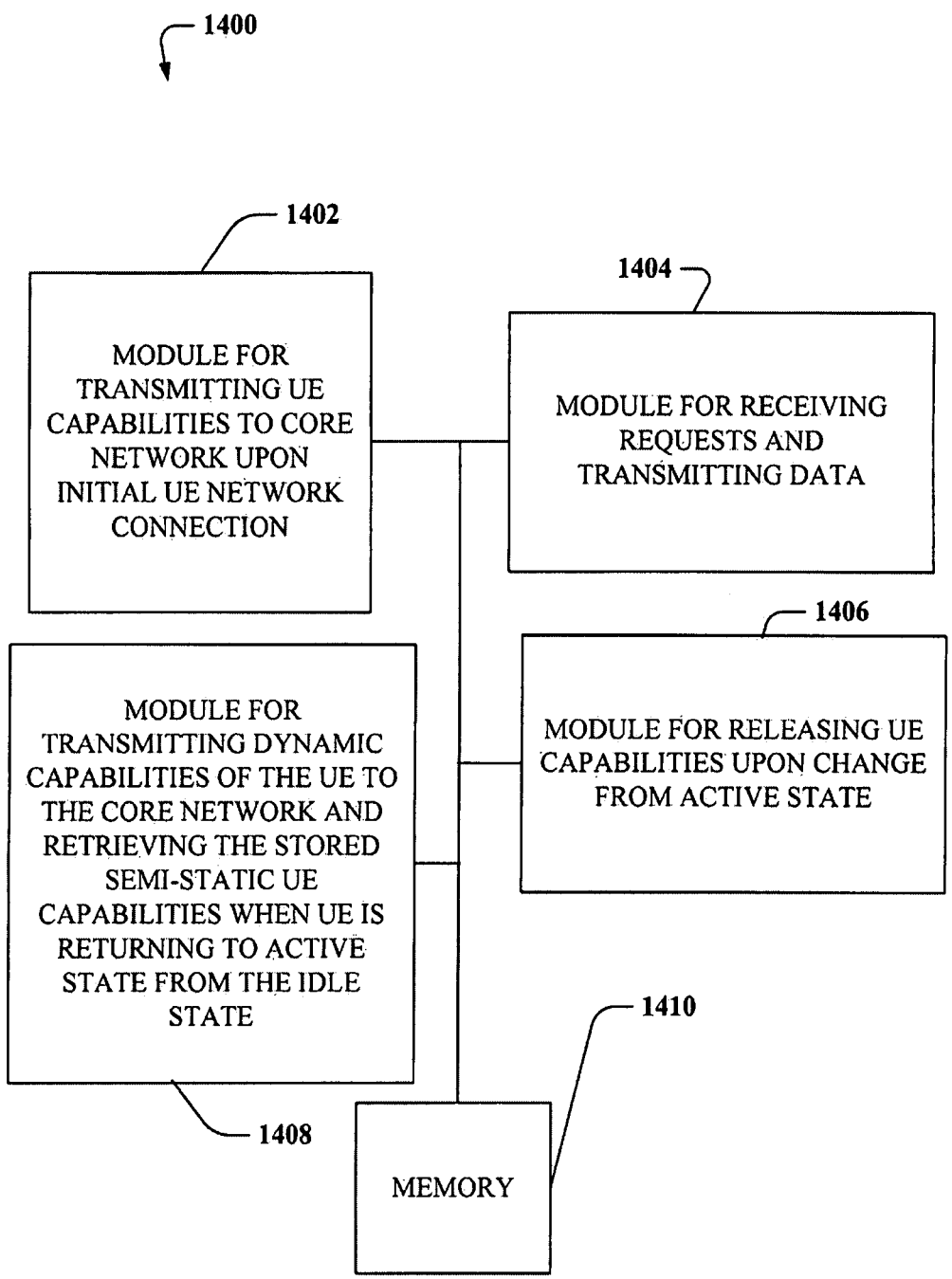
FIG. 14 depicts an exemplary system of a radio network/node B in conjunction with a wireless communication environment in accordance with one or more aspects.

Referring now to FIG. 14, a system 1400 that facilitates fast transitions from an idle state to an active state in a wireless communication is illustrated. System 1400 can include a module 1402 for transmitting UE capabilities to a core network upon initial network connection, a module 1404 for receiving and transmitting data, a module 1406 for releasing UE device capabilities upon a state change of the UE from an active state and a module 1408 for transmitting dynamic capabilities of the UE to the core network and retrieving the stored semi-static capabilities when UE is returning to an active state from an idle state. Modules 1402-1108 may be a processor or any electronic device and may be coupled to memory module 1410.

Figure 15:
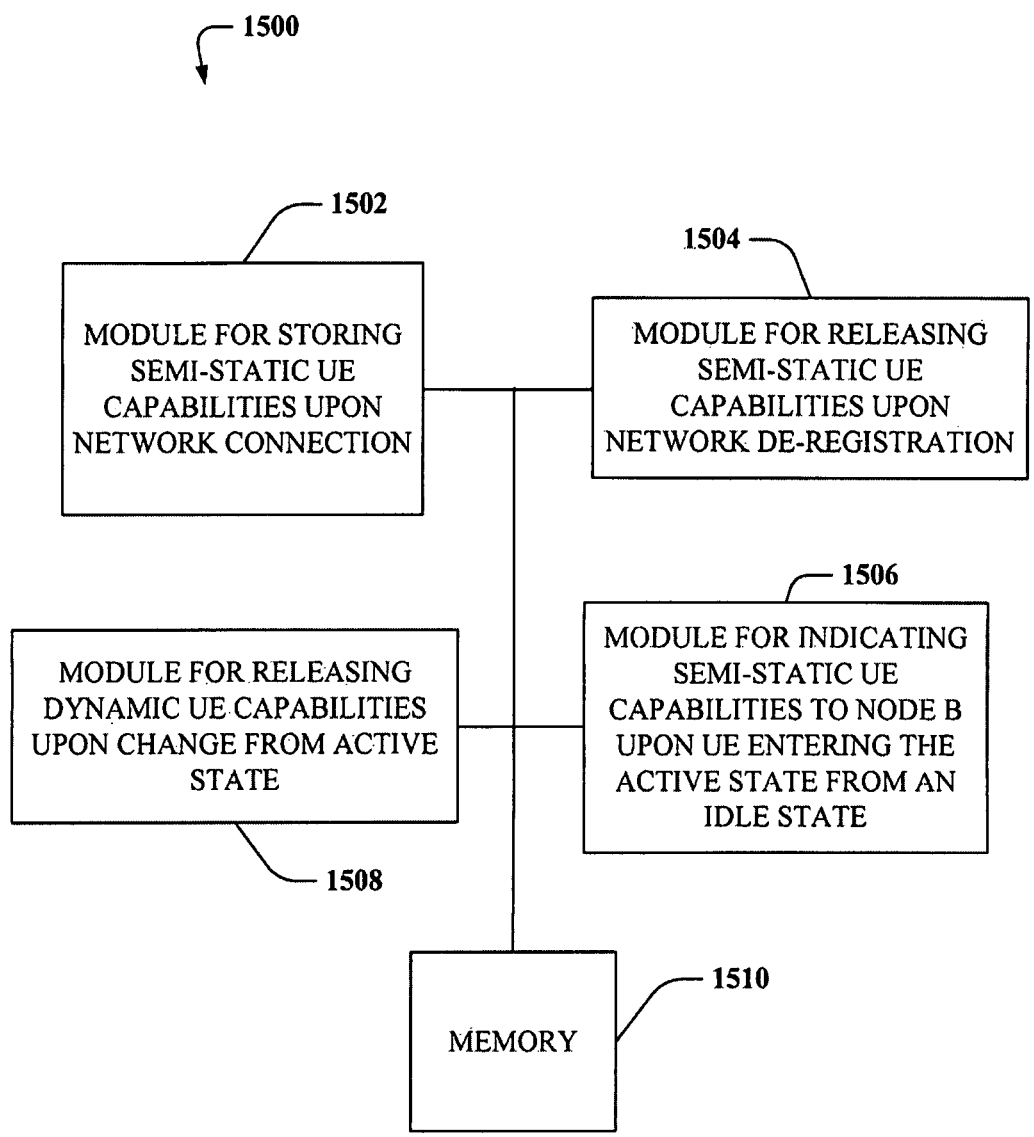
FIG. 15 depicts an exemplary system of a core network in conjunction with a wireless communication environment in accordance with one or more aspects.

Referring now to FIG. 15, a system 1500 that facilitates fast transitions from an idle state to an active state in a wireless communication is illustrated. System 1500 can include a module 1502 for storing semi-static UE capabilities upon wireless network connection, a module 1504 for releasing semi-static UE capabilities upon network de-registration, a module 1506 for indicating semi-static UE capabilities to node B and/or the radio network associated with the UE and a module 1508 for releasing dynamic capabilities upon a UE state change from active state. Modules 1502-1508 can be a processor or any electronic device and may be coupled to memory module 1510.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method operable in a wireless communication network, the method comprising:
    sending an initial connection request, the initial connection request including device capabilities of an indicated user equipment, the device capabilities comprising a first set of radio access network capabilities and a second set of radio access network capabilities, the first set of radio access network capabilities including a packet access category for the indicated user equipment;
    storing the second set of capabilities included in the initial connection request;
    transmitting data via a wireless node;
    transitioning to an idle state;
    when transitioning back to an active state from the idle state when the second set of radio access network capabilities have not changed, sending a connection request with the first set of radio access network capabilities of the user equipment without also transmitting any of the second set of radio access network capabilities to the wireless node; and
    when transitioning back to an active state from the idle state when the second set of radio access network capabilities have changed, sending a connection request including the first set of radio access network capabilities of the user equipment and the changed radio access network capabilities included in the second set of radio access network capabilities, wherein the connection request including the first set of radio access network capabilities of the user equipment and the changed radio access network capabilities included in the second set of radio access network capabilities causes transmission of a storage request including at least the second set of radio access network capabilities to a core network, the storage request identifying elements of the second set of radio access network capabilities for storage until the user equipment de-registers from the network.

2. The method of claim 1, wherein the wireless system is based upon the Long Term Evolution (LTE).

3. The method of claim 1, wherein one or more of the first set of radio access network capabilities is achieved by borrowing one capability for the use of another capability.

4. The method of claim 1, further comprising:
    transitioning to the idle state for a second time; and
    when transitioning back to the active state from the second idle state when the second set of radio access network capabilities have not changed, sending a connection request with the first set of radio access network capabilities of the user equipment without also transmitting the second set of radio access network capabilities to the wireless node.

5. The method of claim 1, wherein the second set of radio access network capabilities comprise a capability that changes when at least one of an accessory is coupled or decoupled from the user equipment or a firmware upgrade is performed on the user equipment.

6. An apparatus operable in a wireless communication network, the apparatus comprising:
    means for indicating a first and a second set of radio access network capabilities of the apparatus to the wireless communication network upon initial connection of the mobile station to the wireless communication network, the first set of radio access network capabilities including a packet access category for the mobile station; and
    means for indicating the first set of radio access network capabilities of the apparatus to the wireless communication network without indicating any of the second set of radio access network capabilities of the apparatus when returning to an active state if the second set of radio access network capabilities of the apparatus have not changed; and
    means for indicating elements of the second set of radio access network capabilities of the apparatus to the wireless communication network when returning to the active state, wherein the elements of the second set of radio access network capabilities are radio access network capabilities included in the second set that have changed, wherein an indication of elements of the second set of radio access network capabilities including changed capabilities causes transmission of a storage request including at least the changed radio access network capabilities to a core network, the storage request identifying elements of the second set of radio access network capabilities for storage until the user equipment de-registers from the network.

7. The apparatus of claim 6, wherein the means for indicating the first set and the second set of radio access network capabilities of the apparatus to the wireless communication network upon initial connection of the mobile station to the wireless communication network comprises means for indicating the first set and the second set of radio access network capabilities of the apparatus as part of a connection request.

8. The apparatus of claim 6, wherein the means for indicating the first set of radio access network capabilities of the apparatus to the wireless communication network without indicating the second set of radio access network capabilities of the apparatus when returning to an active state if the second set of radio access network capabilities of the apparatus have not changed comprises means for indicating the first set of radio access network capabilities of the apparatus to the wireless communication network without indicating the second set of radio access network capabilities of the apparatus when returning from an idle state.

9. A computer program product, comprising:
    a non-transitory computer-readable medium comprising:

code for indicating a first set and a second set of radio access network capabilities of a mobile station to a wireless communication network upon initial connection of the mobile station to the wireless communication network, the first set of radio access network capabilities including a packet access category for the mobile station;

code for, when returning from an idle state to an active state when the second set of radio access network capabilities of the mobile station have not changed, indicating the first set of radio access network capabilities of the mobile station to the wireless communication network without indicating any of the second set of radio access network capabilities of the mobile station; and code for, when transitioning from an idle state to an active state when the second set of radio access network capabilities have changed, sending a connection request including the first set of radio access network capabilities of the user equipment and the changed radio access network capabilities included in the second set of radio access network capabilities, wherein the connection request including the first set of radio access network capabilities of the user equipment and the changed radio access network capabilities included in the second set of radio access network capabilities causes transmission of a storage request including at least the second set of radio access network capabilities to a core network, the storage request identifying elements of the second set of radio access network capabilities for storage until the user equipment de-registers from the network.

10. The computer program product of claim 9, wherein the non-transitory computer-readable medium further comprises code for transitioning to an idle state when predetermined conditions are met.

11. An apparatus operable in a wireless communication network, the apparatus comprising:
at least one processor configured to:
indicate a first set and a second set of radio access network capabilities of the apparatus to the wireless communication network upon initial connection to the wireless communication network, the first set of radio access network capabilities including a packet access category for the apparatus; and
when returning from an idle state to an active state when the second set of radio access network capabilities have not changed, indicating the first set of radio access network capabilities of the apparatus to the wireless communication network without indicating any of the second set of radio access network capabilities of the apparatus; and
when transitioning back to an active state from the idle state when the second set of radio access network capabilities have changed, indicating the first set of radio access network capabilities of the user equipment along with the changed radio access network capabilities included in the second set of radio access network capabilities, wherein an indication of elements of the second set of radio access network capabilities including changed capabilities causes transmission of a storage request including at least the changed radio access network capabilities to a core network, the storage request identifying elements of the second set of radio access network capabilities for storage until the user equipment de-registers from the network.

12. The apparatus of claim 11, wherein the wireless communication network is a cell-based wireless communication network.

13. The apparatus of claim 12, wherein the wireless communication network is a UMTS-based wireless communication network.

14. The apparatus of claim 11, wherein the at least one processor is further configured to:
when the wireless communication network indicates that the network does not know the second set of radio access network capabilities of the apparatus, indicating the second set of radio access network capabilities of the apparatus to the wireless communication network.

15. A method operable in a wireless communication network, the method comprising:
receiving a connection request to establish an active connection, the connection request indicating at least some device capabilities of an indicated mobile station, the device capabilities including a first set of radio access network capabilities and a second set of radio access network capabilities, the first set of radio access network capabilities including a packet access category for the indicated mobile station;
determining capabilities of the indicated mobile station sent with the connection request; and
when the second set of radio access network capabilities of the indicated mobile station are sent with the connection request, transmitting a storage request including at least the second set of radio access network capabilities to a core network, the storage request identifying elements of the second set of radio access network capabilities for storage in the core network until the mobile station de-registers from the network, and
when the second set of radio access network capabilities of the indicated mobile station are not sent with the connection request,
requesting the second set of radio access network capabilities of the indicated mobile station from the core network; and
receiving an indication of the second set of radio access network capabilities of the indicated mobile station from the core network.

16. The method of claim 15, further comprising establishing an active connection with the indicated mobile station in accordance with the capabilities of that mobile station.

17. The method of claim 15, wherein the receiving of a connection request to establish an active connection further comprises at least one of:
receiving a connection request to return from an idle state; or
receiving a connection request for an initial connection to a wireless communication network.

18. A computer program product, comprising:
a non-transitory computer-readable medium comprising:
code for receiving a connection request to establish an active connection in a wireless communication network, the connection request indicating at least some device capabilities of an indicated user equipment, the device capabilities including a first set of radio access network capabilities and a second set of radio access network capabilities, the first set of radio access network capabilities including a packet access category for the indicated user equipment;
code for when the second set of radio access network capabilities of the indicated user equipment are sent with the connection request, transmitting a storage request including at least the second set of radio access network capabilities to a core network, the storage request identifying elements of the second set of radio access network capabilities for storage in the core network until the user equipment de-registers from the network; and code for when the second set of radio access network capabilities of the indicated user equipment are not sent with the connection request, requesting the second set of radio access network capabilities of the indicated user equipment from the core network and receiving an indication of the second set of radio access network capabilities of the indicated user equipment from the core network.

19. The computer product of claim 18 wherein the non-transitory computer-readable medium further comprises code for facilitating establishing a connection with the indicated user equipment in accordance with the capabilities of the user equipment.

20. The computer product of claim 18 wherein the non-transitory computer-readable medium further comprises code for releasing the capabilities of the indicated user equipment when the user equipment enters a non-active state.

21. An apparatus for use in a wireless communication network, the apparatus comprising:
means for receiving multiple connection requests from mobile stations, each request to establish an active connection and the request indicating at least some device capabilities of an indicated mobile station, the device capabilities including a first set of capabilities and a second set of capabilities, the first set of capabilities including a packet access category for the indicated user equipment;
means for requesting the second set of capabilities of an indicated mobile station from a core network of the wireless communication network when the second set of capabilities of the indicated mobile station are not sent with the connection request; and
means for receiving an indication of the second set of capabilities of the indicated mobile station from the core network; and
means for sending the received second set of capabilities of the indicated mobile station to the core network for storage until the indicated mobile station de-registers from the wireless communications network.

22. The apparatus of claim 21 further comprising:
means for receiving an indication that the core network does not know the second set of capabilities of the indicated mobile station and transmitting a request for the second set of capabilities of the indicated mobile station to the indicated mobile station.

23. The apparatus of claim 21 further comprising:
means for releasing the capabilities of the indicated mobile station when the indicated mobile station enters an idle state.

24. An apparatus operable in a wireless communication network, the apparatus comprising:
at least one processor configured to:
receive a connection request to establish an active connection, the connection request indicating at least some device capabilities of an indicated user equipment, the device capabilities including a first set of radio access network capabilities and a second set of radio access network capabilities the first set of radio access network capabilities including a packet access category for the indicated user equipment;
when the second set of radio access network capabilities of the indicated user equipment are sent with the connection request, transmitting a storage request including at least the second set of radio access network capabilities to a core network, the storage request identifying elements of the second set of radio access network capabilities for storage in the core network until the user equipment de-registers from the network; and
when the second set of radio access network capabilities of the indicated user equipment are not sent with the connection request, request the second set of radio access network capabilities of the indicated user equipment from the core network and receive an indication of the second set of radio access network capabilities of the indicated user equipment from the core network.

25. The apparatus of claim 24 wherein the connection request is one of an initial connection request or a connection request when returning to an active state.

26. The apparatus of claim 24 wherein when the second set of capabilities of the indicated user equipment is sent with the connection request, the at least one processor is further configured to transmit the second set of radio access network capabilities of the user equipment to a core network for storage until the indicated user equipment de-registers from the core network.

27. A method in a wireless communication system, the method comprising:
receiving, via a Node B, an indication of a subset of radio access network capabilities of an indicated user equipment upon initial connection to the wireless communication system, said indicated user equipment associated with a set of radio access network capabilities including a number of capabilities greater than a number of capabilities included in said subset, wherein a radio access network capability included in the set and absent from said subset includes a packet access category for the indicated user equipment;
storing the subset of radio access network capabilities of the indicated user equipment at least until the indicated user equipment de-registers from the wireless communication system;
receiving a request for the subset of radio access network capabilities from another Node B associated with the indicated user equipment after the indicated user equipment transitions from an idle state to an active state in response to an active connection request from the user equipment via the another Node B associated with the user equipment; and
transmitting the stored subset of radio access network capabilities of the indicated user equipment to the another Node B associated with the indicated user equipment.

28. The method of claim 27 wherein the method is performed for each of multiple indicated user equipment.

29. An apparatus operable in a wireless communication network, the apparatus comprising:
at least one processor configured to:
receive, via a Node B, an indication of a subset of radio access network capabilities of an indicated mobile station upon initial connection of the mobile station to the wireless network, said indicated mobile station associated with a set of radio access network capabilities including a number of capabilities greater than a number of capabilities included in said subset, wherein a radio access network capability included in the set and absent from said subset includes a packet access category for the indicated mobile station;

store the subset of radio access network capabilities of the indicated mobile station at least until the indicated mobile station de-registers from the wireless communication network; and receive a request for the subset of radio access network capabilities of the mobile station from another Node B associated with the indicated mobile station after the indicated mobile station transitions from an idle state to an active state in response to an active connection request from the mobile station via the another Node B; and transmit the stored subset of radio access network capabilities of the indicated mobile station to the another Node B associated with the indicated mobile station.

30. An apparatus operable in a wireless communication network, the apparatus comprising:

means for receiving, via a Node B, an indication of a subset of radio access network capabilities of an indicated mobile station upon initial connection to the wireless communication network, said indicated mobile station associated with a set of radio access network capabilities including a number of capabilities greater than a number of capabilities included in said subset, wherein a radio access network capability included in the set and absent from said subset includes a packet access category for the indicated mobile station;

means for storing the subset of radio access network capabilities of the indicated mobile station at least until the indicated mobile station de-registers from the wireless communication network; and means for receiving a request for the subset of radio access network capabilities of the mobile station from another Node B associated with the indicated mobile station after the indicated mobile station transitions from an idle state to an active state in response to an active connection request from the mobile station via the another Node B and for transmitting the stored subset of radio access network capabilities of the indicated mobile station to the another Node B associated with the indicated mobile station.

31. The apparatus of claim 30 further comprising means for releasing the subset of radio access network capabilities of the indicated mobile station when the mobile station de-registers from the wireless communication network.

32. A computer program product, comprising:

a non-transitory computer-readable medium comprising:

code for receiving, via a Node B, an indication of capabilities of an indicated mobile station upon initial connection to a wireless communication network, the capabilities including first set of radio access network capabilities and a second set of radio access network capabilities, the first set of radio access network capabilities including a packet access category for the indicated mobile station;

code for storing the second set of radio access network capabilities of the indicated mobile station at least until the indicated mobile station de-registers from the wireless communication network;

code for receiving a request for the subset of radio access network capabilities of the mobile station from another Node B associated with the indicated mobile station after the indicated mobile station transitions from an idle state to an active state in response to an active connection request from the mobile station via the another Node B associated with the mobile station; and code for transmitting the stored second of radio access network capabilities of the indicated mobile station to the another Node B associated with the indicated mobile station.

33. The computer product of claim 32 wherein the non-transitory computer-readable medium further comprises code for releasing the first set of radio access network capabilities of the mobile station when the mobile station enters a non-active state.

34. The computer product of claim 32 wherein the non-transitory computer-readable medium further comprises code for releasing the second set of radio access network capabilities of the mobile station when the mobile station de-registers from the wireless communication network.

* * * * *